United States Patent
Ojima et al.

(10) Patent No.: US 9,216,718 B2
(45) Date of Patent: Dec. 22, 2015

(54) BATTERY MOUNTING APPARATUS FOR ELECTRIC VEHICLE, BATTERY UNIT TRANSFER APPARATUS FOR ELECTRIC VEHICLE, AND METHOD FOR MOUNTING BATTERY UNIT

(71) Applicant: KABUSHIKI KAISHA TOYOTA JIDOSHOKKI, Kariya-shi, Aichi-ken (JP)

(72) Inventors: Yoshio Ojima, Kariya (JP); Takahiro Fukagawa, Kariya (JP); Takashi Murase, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 81 days.

(21) Appl. No.: 13/693,576

(22) Filed: Dec. 4, 2012

(65) Prior Publication Data

US 2013/0140099 A1    Jun. 6, 2013

(30) Foreign Application Priority Data

Dec. 6, 2011    (JP) .................................. 2011-267384

(51) Int. Cl.
| | | |
|---|---|---|
| *H02J 7/00* | (2006.01) | |
| *B60S 5/06* | (2006.01) | |
| *B60K 1/04* | (2006.01) | |
| *H01M 2/10* | (2006.01) | |
| *B65G 67/00* | (2006.01) | |

(52) U.S. Cl.
CPC ... *B60S 5/06* (2013.01); *B60K 1/04* (2013.01); *H01M 2/1083* (2013.01); *B65G 67/00* (2013.01); *H02J 7/00* (2013.01); *Y02T 90/124* (2013.01); *Y10T 29/49002* (2015.01); *Y10T 29/5313* (2015.01)

(58) Field of Classification Search
None
See application file for complete search history.

(56) References Cited

FOREIGN PATENT DOCUMENTS

| | | |
|---|---|---|
| CN | 1339001 A | 3/2002 |
| CN | 101870284 A | 10/2010 |
| JP | 06262951 A | 9/1994 |
| JP | 2010-137700 A | 6/2010 |
| JP | 2010-173364 A | 8/2010 |
| WO | 0058139 A1 | 10/2000 |
| WO | WO 0058139 A1 * | 10/2000 |

OTHER PUBLICATIONS

Communication dated Oct. 10, 2014 from the State Intellectual Property Office of P.R. China in counterpart application No. 201210517846.3.

* cited by examiner

*Primary Examiner* — John Walters
*Assistant Examiner* — Hilary L Johns
(74) *Attorney, Agent, or Firm* — Sughrue Mion, PLLC (57) ABSTRACT

A battery unit mounting apparatus for an electric vehicle includes four or more fixing portions configured to be provided at the bottom of an electric vehicle and four or more corresponding portions-to-be-fixed on a battery unit. When the battery unit is raised toward the vehicle, the battery unit mounting apparatus causes each fixing portion to be engaged with the corresponding one of the portions-to-be-fixed. There is a first group, formed by three of the fixing portions and corresponding three of the portions-to-be-fixed, and a second group, formed by the remaining one or more of the fixing portions and the remaining one or more of the portions-to-be-fixed. The fixing portion and the portion-to-be-fixed in the second group are configured to be engaged with each other after the fixing portions and the portions-to-be-fixed in the first group are engaged.

6 Claims, 7 Drawing Sheets

BATTERY MOUNTING APPARATUS FOR ELECTRIC VEHICLE, BATTERY UNIT TRANSFER APPARATUS FOR ELECTRIC VEHICLE, AND METHOD FOR MOUNTING BATTERY UNIT

BACKGROUND OF THE INVENTION

The present invention relates to a battery unit mounting apparatus for an electric vehicle, a battery unit transfer apparatus used with the battery unit mounting device, and a method for mounting a battery unit.

Japanese Laid-Open Patent Publication No. 2010-173364 discloses a conventional battery unit transfer apparatus. The battery unit transfer apparatus includes a lift actuator for raising a polyhedron jig from below an electric vehicle, a battery fixing means for fixing a battery unit on the polyhedron jig, and an inclination adjusting means.

In the battery unit transfer apparatus, the battery fixing means fixes a battery unit on the polyhedron jig, and the lift actuator raises the polyhedron jig. The inclination adjusting means then rotates the polyhedron jig, thereby adjusting the inclination of the battery fixing means. Accordingly, the bottom of the body of the electric vehicle and the battery unit on the polyhedron jig become parallel with each other. Thus, even if the vehicle body is inclined relative to the horizontal plane because of occupants and cargo, the battery unit can be fixed to the vehicle body. Therefore, when mounting a battery unit to a vehicle body, the battery unit transfer apparatus is capable of easily mounting the battery unit to the vehicle body even if the electric vehicle is inclined.

The description of the above described conventional battery unit transfer apparatus does not clearly disclose a means for fixing the body of an electric vehicle and a battery unit to each other. However, it is assumed that fixing portions provided on the bottom of the vehicle body and portions-to-be-fixed of the battery unit are engaged with or disengaged from each other, so that the battery unit is mounted or removed. Since a battery unit is a heavy object, it is preferable that a vehicle body and a battery unit be engaged with each other at two or more, particularly, four or more locations, so that a battery unit is stably mounted on the vehicle body even while the electric vehicle is traveling. Hereinafter, a case will be discussed in which the above described battery unit transfer apparatus fixes a vehicle body and a battery unit to each other using fixing portions and portions-to-be-fixed, each being provided at four locations.

Due to manufacturing tolerances, the heights of fixing portions and portions-to-be-fixed vary. Such varied heights cause problems different from an inclination of a vehicle body. Therefore, even if the above described battery unit transfer apparatus adjust the inclination of a battery unit to match with the inclination of a vehicle body, the height variations are not resolved.

SUMMARY OF THE INVENTION

In general, when a battery unit transfer apparatus raises a battery unit from below an electric vehicle, the fixing portions contact the portions-to-be-fixed in the order from the one that is at a position of the shortest distance between the vehicle body and the battery unit. Subsequently, three fixing portions and three portions-to-be-fixed are engaged with each other at three locations, so that three space coordinates are determined. This determines an imaginary plane defined by three of the fixing portions of the vehicle body and an imaginary plane defined by three of the portions-to-be-fixed of the battery unit. Accordingly, the vehicle body and the battery unit become parallel with each other. Thereafter, the fixing portion and the portion-to-be-fixed at the last location are engaged with each other.

Such variations in the timing at which the fixing portions and the portions-to-be-fixed are engaged derive from height differences of the fixing portions and the portions-to-be-fixed due to manufacturing tolerances. Therefore, even if the battery unit and mounting surface on the bottom of the vehicle body are made parallel with each other, the engaging timing can vary depending on the combination of three fixing portions that define the imaginary plane of the vehicle body and the combination of three portions-to-be-fixed that define the imaginary plane of the battery unit. Thus, the last one of the fixing portions and the last one of the portions-to-be-fixed cannot be identified. Therefore, according to the above described battery unit transfer apparatus, the engagement at the last location must be executed by applying a great load onto the entire battery unit. In other words, the battery unit is likely to receive an excessive load as a whole, which may degrade the durability of the battery unit.

Accordingly, it is an objective of the present invention to provide a battery unit mounting apparatus for an electric vehicle that is capable of properly mounting a battery unit to the bottom of a vehicle body, while ensuring the durability of the battery unit.

To achieve the foregoing objective and in accordance with a first aspect of the present invention, a battery unit mounting apparatus for an electric vehicle is provided. The apparatus includes four or more fixing portions configured to be arranged at the bottom of the vehicle body of an electric vehicle and four or more portions-to-be-fixed configured to be arranged on a battery unit. Each portion-to-be-fixed corresponds to one of the fixing portions. When the battery unit is raised to approach the vehicle body bottom, the battery unit mounting apparatus is used to cause each fixing portion to be engaged with the corresponding one of the portions-to-be-fixed, thereby mounting the battery unit to the vehicle body bottom. The fixing portions and the portions-to-be-fixed are sorted into a first engagement group formed by three of the fixing portions and corresponding three of the portions-to-be-fixed, and a second engagement group formed by the remaining one or more of the fixing portions and the remaining one or more of the portions-to-be-fixed. The fixing portion and the portion-to-be-fixed in the second engagement group are configured to be engaged with each other after the fixing portions and the portions-to-be-fixed in the first engagement group are all engaged.

In accordance with a second aspect of the present invention, a battery unit transfer apparatus for an electric vehicle used with a battery unit mounting apparatus for an electric vehicle is provided. The battery unit transfer apparatus is capable of raising a battery unit toward the bottom of a vehicle body. The battery unit mounting apparatus includes four or more fixing portions configured to be arranged at the bottom of the vehicle body of an electric vehicle and four or more portions-to-be-fixed configured to be arranged on a battery unit. Each portion-to-be-fixed corresponds to one of the fixing portions. The fixing portions and the portions-to-be-fixed are sorted into a first engagement group formed by three of the fixing portions and corresponding three of the portions-to-be-fixed, and a second engagement group formed by the remaining one or more of the fixing portions and the remaining one or more of the portions-to-be-fixed. The fixing portion and the portion-to-be-fixed in the second engagement group are configured to be engaged with each other after the fixing portions and the portions-to-be-fixed in the first engagement group are all engaged. The battery unit transfer apparatus includes at least one first group stage capable of supporting from below the three portions-to-be-fixed of the first engagement group and a second group stage capable of supporting from below the portion-to-be-fixed in the second engagement group. The second group stage is capable of being raised in synchronization with the first group stage, and being raised relative to the first group stage.

In accordance with a third aspect of the present invention, a battery unit mounting apparatus for an electric vehicle, the apparatus comprising a plurality of stages configured to support a battery unit. The stages include three individual stages that are sorted as first group stages and at least one individual stage that is sorted as a second group stage. The individual stages that are the first group stages are raised in synchronization. The second group stage is capable of being raised in synchronization with the first group stages, capable of being raised independently from the first group stages, and capable of being raised to a position higher than that of the first group stages.

In accordance with a fourth aspect of the present invention, a method for mounting a battery unit to the bottom of an electric vehicle by using a battery unit mounting apparatus that includes four or more fixing portions configured to be arranged at the bottom of the vehicle body of an electric vehicle and four or more portions-to-be-fixed configured to be arranged on a battery unit. Each portion-to-be-fixed corresponds to one of the fixing portions. The fixing portions and the portions-to-be-fixed are sorted into a first engagement group formed by three of the fixing portions and corresponding three of the portions-to-be-fixed, and a second engagement group formed by the remaining one or more of the fixing portions and the remaining one or more of the portions-to-be-fixed. The three fixing portions in the first engagement group are arranged substantially at the same height, and the fixing portion of the second engagement group is located at a position higher than the fixing portions in the first engagement group. The method includes: raising the battery unit so that the battery unit approaches the vehicle body bottom, thereby raising the three fixing portions in the first engagement group and the fixing portion in the second engagement group in synchronization; causing the fixing portions and the portions-to-be-fixed in the first engagement group to be all engaged; detecting that the fixing portions and the portions-to-be-fixed in the first engagement group are all engaged; stopping raising the fixing portions in the first engagement group after it is detected that the fixing portions and the portions-to-be-fixed in the first engagement group are all engaged; and raising the fixing portion in the second engagement group so that the fixing portion in the second engagement group is engaged with the portion-to-be-fixed in the second engagement group.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First and second embodiments of the present invention will now be described with reference to the drawings. In the following embodiments, it is assumed, for the illustrative purposes, that the upper surface of a battery unit and the bottom of a vehicle body, in which a mounting space of an electric vehicle is located, are arranged to be parallel with each other.

First Embodiment

Figure 1:
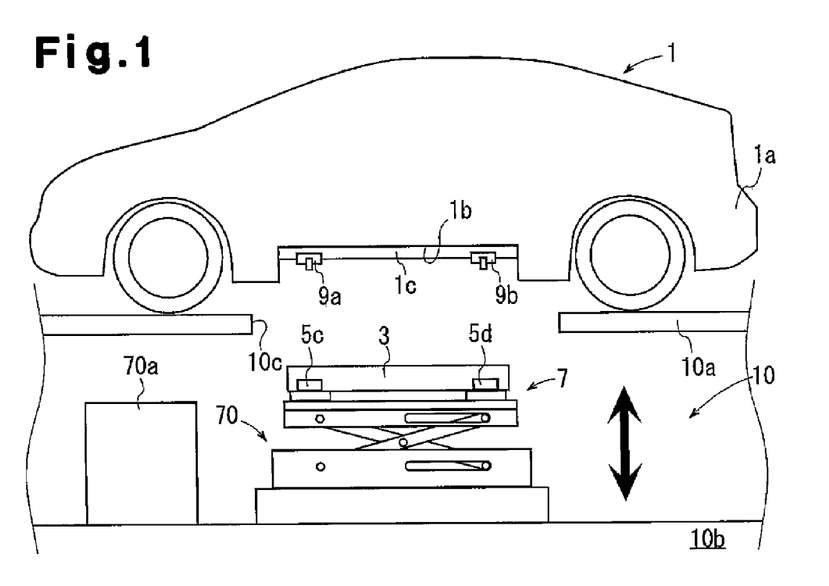
FIG. 1 is a side view showing mounting and removing of a battery unit to and from a vehicle body.
Figure 2:
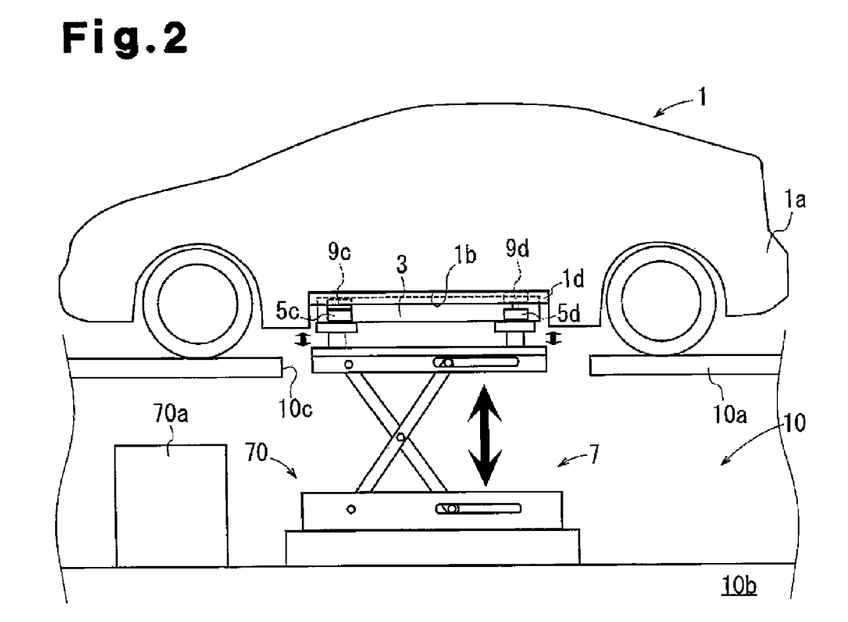
FIG. 2 is a side view showing mounting and removing of the battery unit to and from the vehicle body.

As shown in FIGS. 1 and 2, a battery unit mounting apparatus according to the first embodiment is designed for an electric vehicle 1. The electric vehicle 1 has a mounting space 1b for mounting a battery unit 3 in a lower portion of a vehicle body 1a. The vehicle body 1a has frames 1c, 1d, which are located on the right and left sides of the vehicle body 1a and extend in the front-rear direction. The frames 1c, 1d form side edges of the mounting space 1b. FIG. 1 shows the frame 1c, which is located on the right side of the vehicle body 1a, and FIG. 2 shows the frame 1d, which is located on the left side of the vehicle body 1a.

When the storage amount of the battery unit 3 is reduced due to travel of the vehicle 1, the battery unit mounting apparatus removes the battery unit 3 from the vehicle body 1a and replaces it with a charged battery unit 3.

Replacement of the battery unit 3, or a process for mounting the battery unit 3, is performed on a battery replacement station 10 (hereinafter, referred to as a station 10). The station 10 includes an upper floor 10a and a lower floor 10b, which is located underneath the upper floor 10a. The electric vehicle 1 can be parked on the upper floor 10a. A communication opening 10c is formed in the upper floor 10a to allow the space above the upper floor 10a to communicate with the space between the upper floor 10a and the lower floor 10b. A transfer apparatus 7 used in the battery unit mounting apparatus is located on the lower floor 10b of the station 10. The transfer apparatus 7 is located on the lower floor 10b. The transfer apparatus 7 includes a transfer apparatus main body 70 and a control unit 70a, which is located in the vicinity of the transfer apparatus main body 70.

Figure 3:
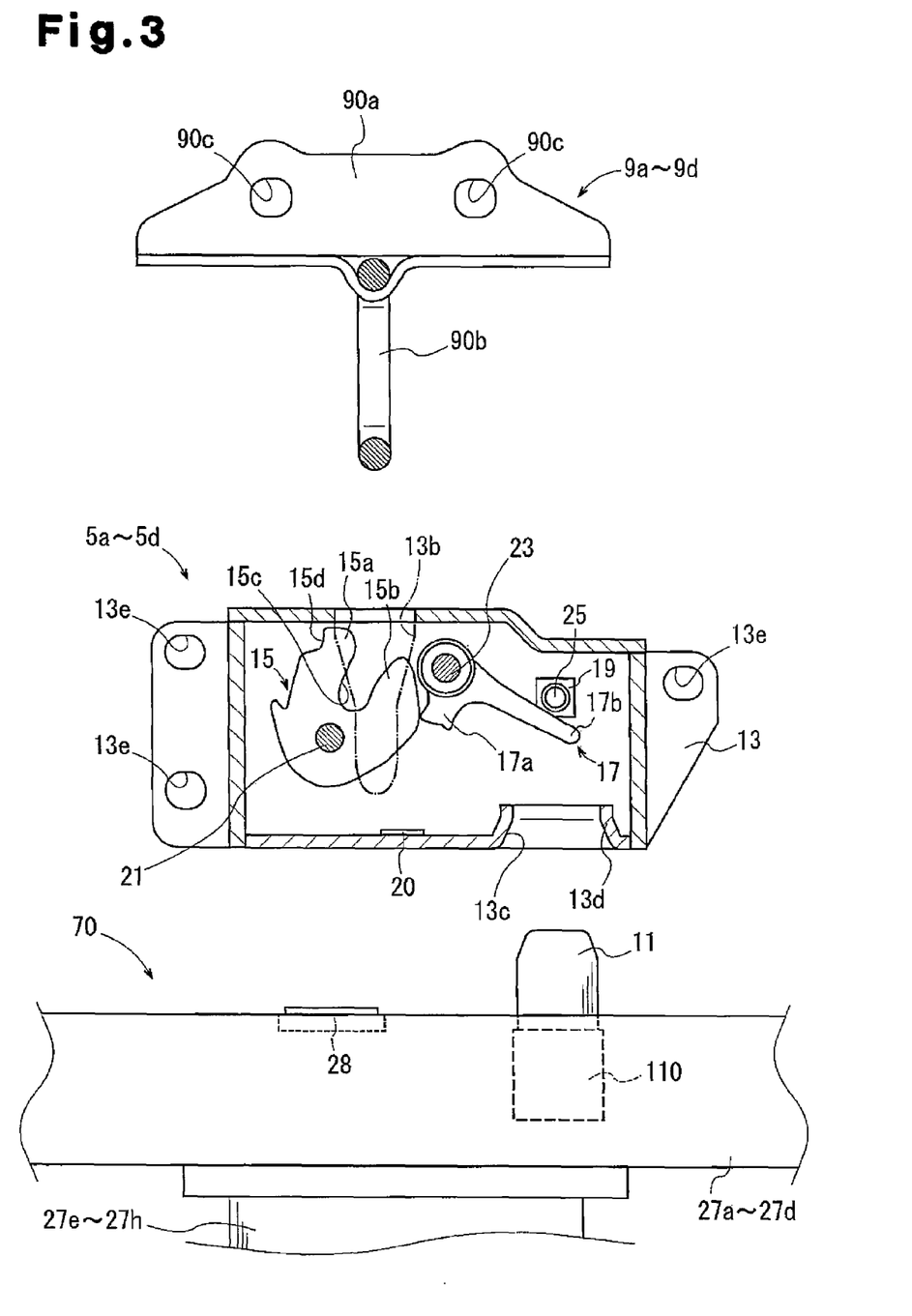
FIG. 3 is a cross-sectional view showing a striker device, a lock device, an individual stage, and a telescopic rod.
Figure 4A:
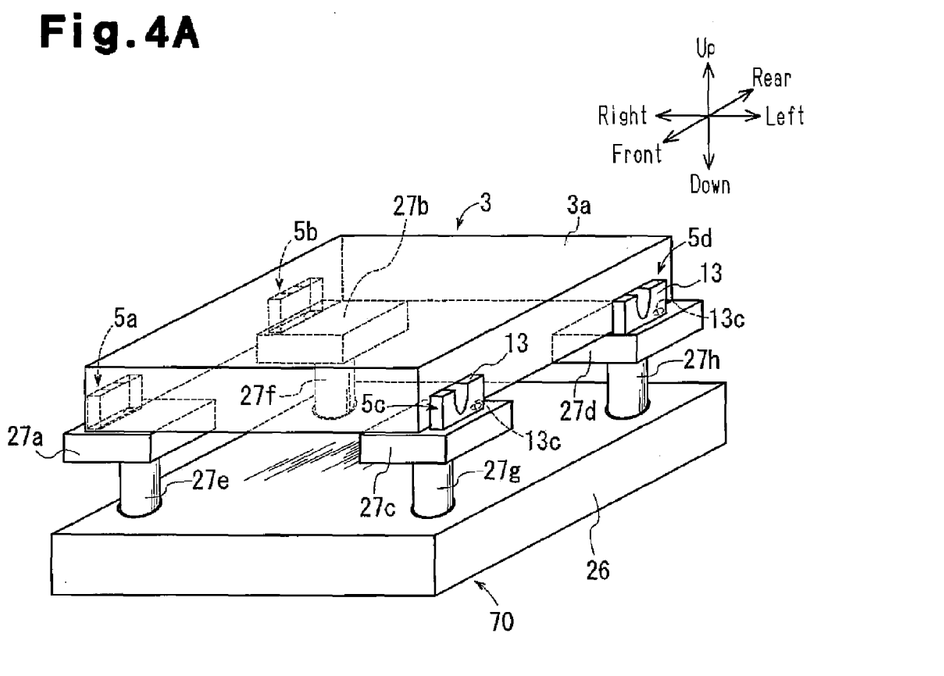
FIG. 4A is a perspective view illustrating a positional relationship according to a first embodiment among a battery unit, lock devices, individual stages on support tables, and telescopic rods, in which the battery unit and the lock devices are mounted on the stages in raised states.
Figure 4B:
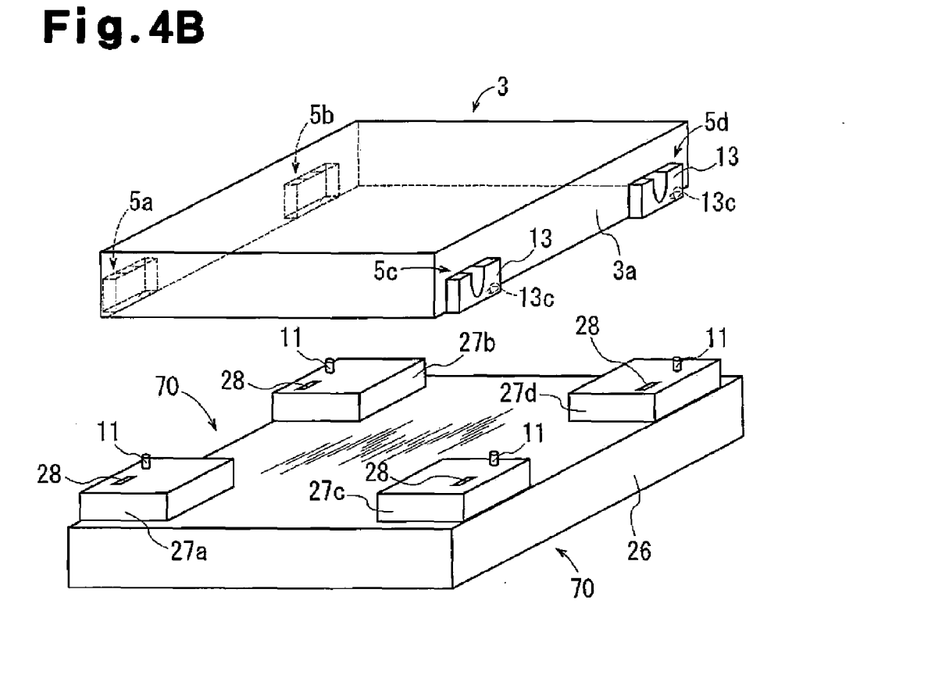
FIG. 4B illustrates a state in which the individual stages are lowered.

As shown in FIG. 3, the battery unit mounting apparatus includes four striker devices 9a to 9d and corresponding lock devices 5*a* to 5*d*. The striker devices 9*a* to 9*d* are fixed to the frame 1*c* or the frame 1*d* at the bottom of the vehicle body 1*a*. As shown in FIGS. 4A and 4B, the lock devices 5*a* to 5*d* are provided on the battery unit 3. The striker devices 9*a* to 9*d* correspond to fixing portions, and the lock devices 5*a* to 5*d* correspond to portions-to-be-fixed. All the striker devices 9*a* to 9*d* have the same structure, and all the lock devices 5*a* to 5*d* have the same structure.

The striker devices 9*a* to 9*d* and the lock devices 5*a* to 5*d* are sorted into a first engagement group and a second engagement group. Specifically, the striker devices 9*a* to 9*c* and the corresponding lock devices 5*a* to 5*c* form the first engagement group. Also, the striker device 9*d* and the corresponding lock device 5*d* form the second engagement group.

As shown in FIG. 3, each of the striker devices 9*a* to 9*d* has a base plate 90*a*, which is fixed to the frame 1*c* or 1*d* shown in FIG. 1, and a striker 90*b*, which is fixed to the base plate 90*a*. The base plate 90*a* has bolt holes 90*c* for fixing the base plate 90*a* to the frame 1*c* or 1*d*. The striker 90*b* is formed applying bending process to steel several times, and substantially has a loop-like shape. The base plate 90*a* and the striker 90*b* are integrated through welding.

Among the striker devices 9*a* to 9*d*, the striker devices 9*a*, 9*b* are fixed to the frame 1*c* as shown in FIG. 1 to be located inside the mounting space 1*b*. The striker devices 9*c*, 9*d* are fixed to the frame 1*d* as shown in FIG. 2 to be located inside the mounting space 1*b*.

Although the striker device 9*a* and the striker device 9*b* have component and assembly tolerances, these are fixed substantially at the same height on the frame 1*c*. The striker device 9*c* is fixed to the frame 1*d* to be substantially at the same height as the striker devices 9*a*, 9*b*. In contrast, the striker device 9*d* is fixed at a position on the frame 1*d* that is higher than the striker device 9*c*. That is, in the mounting space 1*b*, the striker device 9*d* is located at a position higher than the striker devices 9*a* to 9*c*.

As shown in FIGS. 4A and 4B, the battery unit 3 has a case 3*a*, which is shaped as rectangular parallelepiped, and batteries (not shown) housed in the case 3*a*. The case 3*a* also has connection terminals, which can be electrically connected the vehicle body 1*a* with the batteries. The battery unit 3 has in it an in-unit controller having a wireless communication unit (not shown). The in-unit controller performs communication with the control unit 70*a*. The shape of the case 3*a* may be changed as required in accordance with the shape of the mounting space 1*b* shown in FIG. 1.

The lock devices 5*a* to 5*d* are attached to left and right long sides at positions corresponding to the striker devices 9*a* to 9*d*. That is, two of the lock devices 5*a* to 5*d* are attached to either side surface. Specifically, the lock devices 5*a*, 5*b* are fixed to the right side of the case 3*a*. The lock devices 5*c*, 5*d* are fixed to the left side of the case 3*a*. Although the lock devices 5*a* to 5*d* have component and assembly tolerances, these are fixed substantially at the same height on the case 3*a*.

As shown in FIG. 3, the lock devices 5*a* to 5*d* each have a housing 13, a latch 15, a pawl 17, and a first solenoid 19. A lock pin 25 is fixed to the first solenoid 19. The lock devices 5*a* to 5*d* each have a proximity sensor 20. Various types of sensors may be employed as the proximity sensors 20. As the proximity sensors 20, magnetic sensors that magnetically detect approach of the latches 15 are used.

As shown in FIGS. 4A and 4B, the housing 13 is fixed to a side of the case 3*a* of the battery unit 3. As illustrated in FIG. 3, the housing 13 has an entry opening 13*b*, which opens upward and extends downward to allow entry of the striker 90*b*. The housing 13 has an insertion hole 13*c*, which extends from the lower end of the housing 13 to the interior. The insertion hole 13*c* receives a pin 11. A guide portion 13*d* for guiding the pin 11 is formed about the insertion hole 13*c* by bending a part of the housing 13. The housing 13 further has bolt holes 13*e* at three locations. The housing 13 is fixed to the case 3*a* with bolts (not shown) inserted into the bolt holes 13*e*.

A substantially U-shaped recess 15*c* is formed in a part of the latch 15. An upper claw portion 15*a* is formed at a position above the recess 15*c*, and lower claw portion 15*b* is formed at a position below the recess 15*c*. The recess 15*c* has a shape for receiving the striker 90*b* entering the entry opening 13*b* of the housing 13. Further, an engaging surface 15*d* is formed in the vicinity of the upper claw portion 15*a*. The engaging surface 15*d* is located on the opposite side from the recess 15*c*.

The latch 15 is supported by a first swing shaft 21 to be allowed to swing. As the latch 15 swings between an engaged state, in which the latch 15 locks the striker 90*b* in the entry opening 13*b*, and a release state, in which the latch 15 releases the striker 90*b* in the entry opening 13*b*. The latch 15 is urged toward the release state by a coil spring (not shown).

The pawl 17 has a locking piece 17*a* and an operative piece 17*b*, which are substantially perpendicular to each other. The pawl 17 is substantially L-shaped. The pawl 17 is supported by a second swing shaft 23 to be allowed to swing. As the pawl 17 swings, the locking piece 17*a* is switched between a state for locking the latch 15 against swinging and a state for allowing the latch 15 to swing. The pawl 17 is urged by a coil spring (not shown) to inhibit swinging of the latch 15.

The first solenoid 19 is electrically connected to the in-unit controller and is controlled by the control unit 70*a* via the in-unit controller and the wireless communication unit. The first solenoid 19, which is illustrated in FIG. 3, is driven by the control unit 70*a* to switch between a state in which the lock pin 25 is horizontally projected into the housing 13 and a state in which the lock pin 25 is retracted in the first solenoid 19. When the lock pin 25 is horizontally projected into the housing 13, the pawl 17 is locked against swinging.

The proximity sensor 20 is arranged in the housing 13. The proximity sensor 20 is electrically connected to the in-unit controller and transmits detection signals to the control unit 70*a* via the in-unit controller and the wireless communication unit. The proximity sensors 20 send detection signals to the control unit 70*a* when the lock devices 5*a* to 5*d* and the strikers 90*b* are engaged.

Since the lock devices 5*a* to 5*d* are fixed to the case 3*a* (the battery unit 3) as described above, the proximity sensors 20 individually detect engagement between the lock devices 5*a* to 5*d* and the strikers 90*b*. That is, the control unit 70*a* receives detection signals from four locations.

Figure 5A:
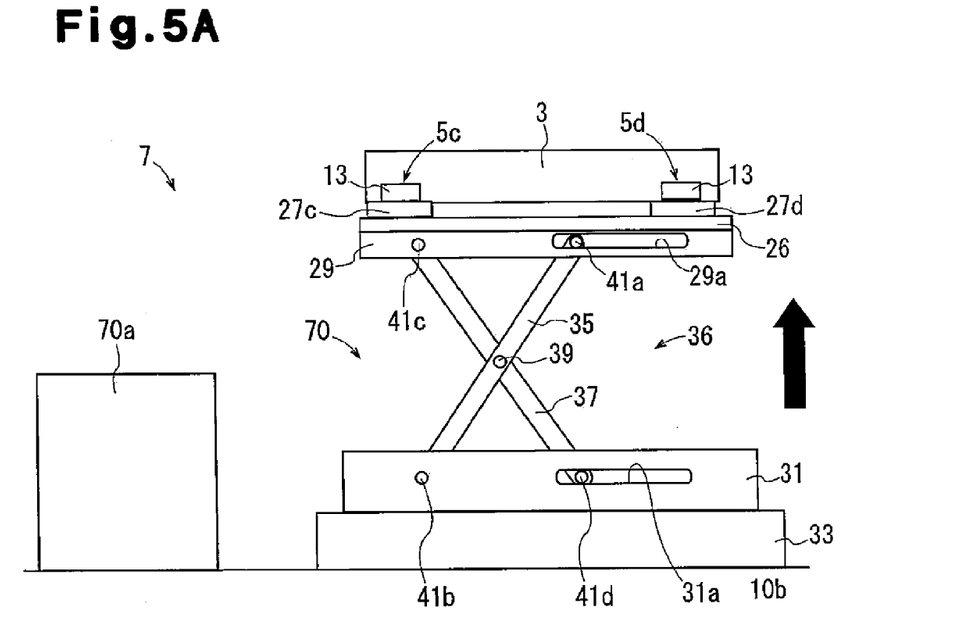
FIG. 5A is a side view of a transfer apparatus according to the first embodiment, illustrating a state in which an overall lift mechanism is raised.
Figure 5B:
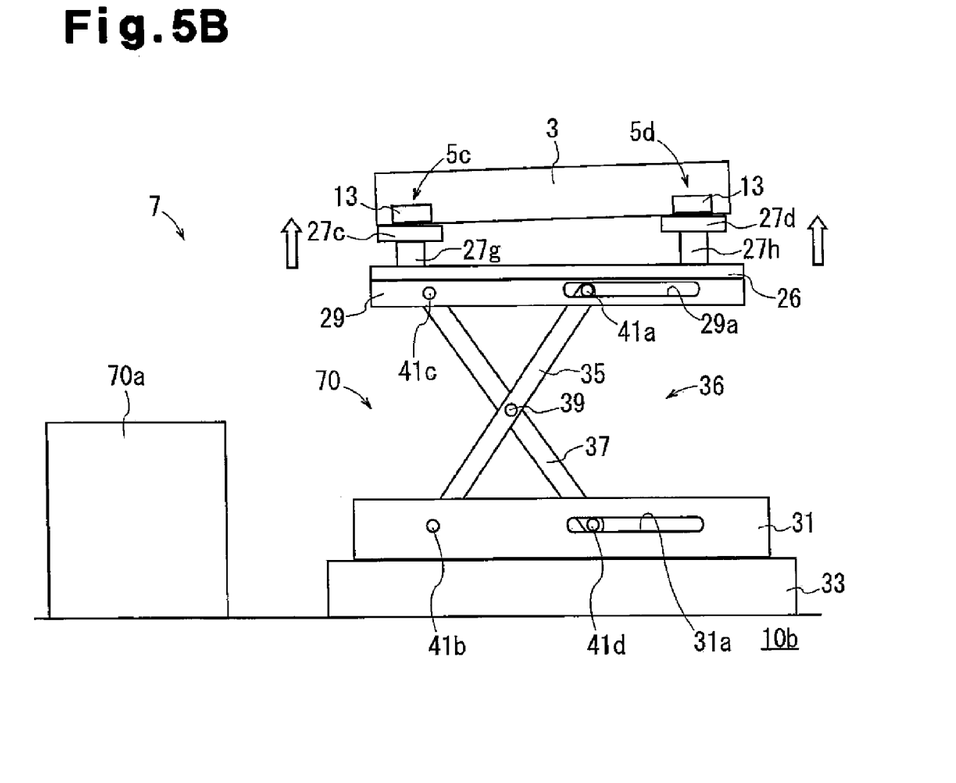
FIG. 5B illustrates a state in which the overall lift mechanism and the individual stages are both raised.

As shown in FIGS. 5A and 5B, the main body 70 of the transfer apparatus 7 includes a base 33 fixed to the lower floor 10*b*, an overall lift mechanism 36, a support table 26, four telescopic rods 27*e* to 27*h*, which are shown in FIGS. 4A and 4B and serve as individual lift mechanisms, and four individual stages 27*a* to 27*d*.

With reference to FIGS. 5A and 5B, the base 33 accommodates a motor (not shown) and a gear train, which transmits force of the motor to the overall lift mechanism 36. The motor is electrically connected to the control unit 70*a*.

The overall lift mechanism 36 includes a lower holding member 31, a pair of first link members 35, a pair of second link member 37, and an upper holding member 29. The lower holding member 31 is fixed to the base 33. The lower holding member 31 has a pair of elongated holes 31*a*, which extend in the horizontal direction. The upper holding member 29 also has a pair of elongated holes 29*a*, which extend in the horizontal direction. The first and second link members 35, 37 have the same length, and are connected each other via coupling pins 39 at the middle portions. The lower end of each first link member 35 is coupled to the lower holding member 31 via a coupling shaft 41b to be allowed to swing. In contrast, the lower end of each second link member 37 is coupled to a coupling shaft 41d, which is connected to the gear train, and the second link member 37 is allowed to swing with respect to the lower holding member 31 and slide in the corresponding elongated hole 31a. The upper end of each second link member 37 is coupled to the upper holding member 29 via a coupling shaft 41c to be allowed to swing. In contrast, the upper end of each first link member 35 is coupled to the upper holding member 29 via a coupling shaft 41a to be allowed to swing and slide along the elongated hole 29a. The support table 26 is fixed to the upper holding member 29. A drive unit such as an electrical direct-acting cylinder or a hydraulic cylinder may be employed as the overall lift mechanism 36.

As shown in FIG. 4A, the support table 26 has telescopic rods 27e to 27h and individual stages 27a to 27d. The individual stages 27a to 27d are connected to the telescopic rods 27e to 27h on the back surfaces, or on the lower surfaces. The battery unit 3 can be mounted on the individual stages 27a to 27d. With the battery unit 3 mounted thereon, the individual stages 27a to 27d contact and support the corresponding lock devices 5a to 5d from below. Specifically, the individual stage 27a is capable of supporting the lock device 5a from below, and the individual stage 27b is capable of supporting the lock device 5b from below. Further, the individual stage 27c is capable of supporting the lock device 5c from below, and the individual stage 27d is capable of supporting the lock device 5d from below.

Since the lock devices 5a to 5c are sorted into the first engagement group as described above, the individual stages 27a to 27c, which correspond to the lock devices 5a to 5c, form a first group stage. Likewise, since the lock device 5d is sorted into the second engagement group, the individual stage 27d, which corresponds to the lock devices 5d, forms a second group stage.

Also, as shown in FIG. 4B, a pin 11 and a limit switch 28 are attached to the surface of each of the individual stages 27a to 27d. The details of the pin and the limit switch 28 will be discussed below.

Figure 6:
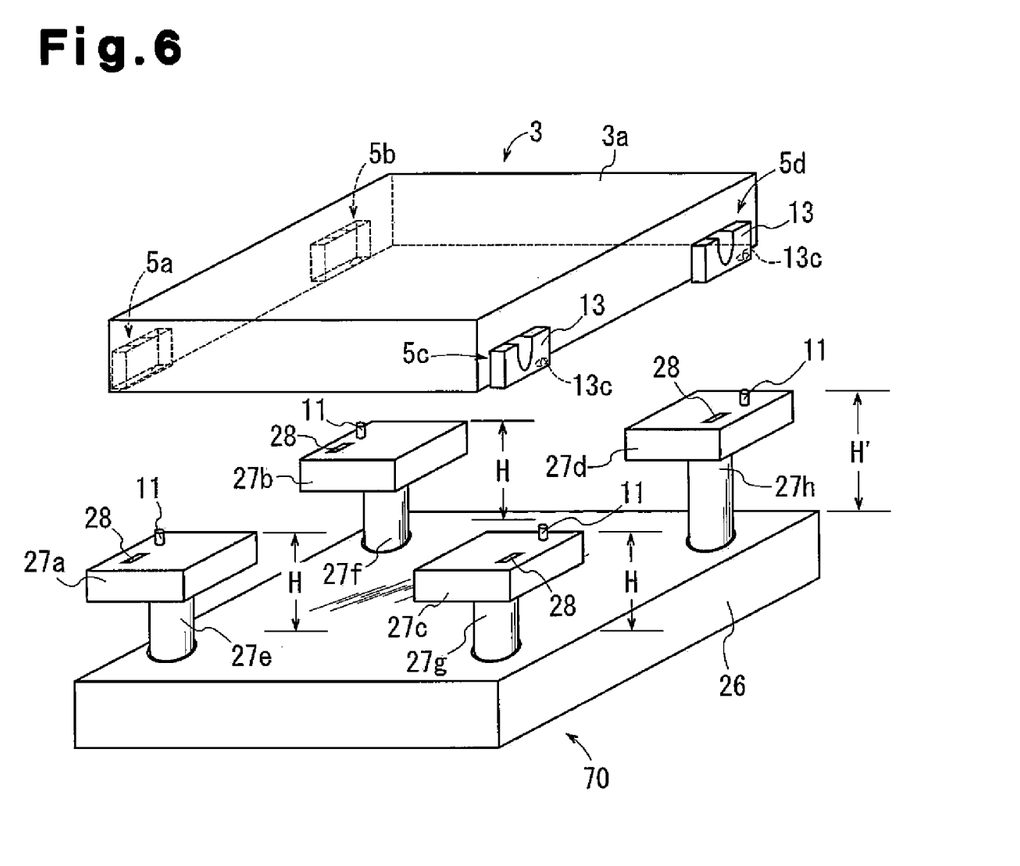
FIG. 6 is a perspective view showing a raising range of the individual stages.

The telescopic rods 27e to 27g, which are connected to the individual stages 27a to 27c, can be extended and contracted within a predetermined range. Specifically, as shown in FIG. 6, the telescopic rods 27e to 27g can be extended to lift the individual stages 27a to 27c up to a height H.

The telescopic rod 27h, which is connected to the individual stage 27d, is extended and contracted within a range larger than that of the other telescopic rods 27e to 27g. The telescopic rod 27h can be extended to lift the individual stage 27d up to a height H', which is higher than the height H. That is, the individual stage 27d can be raised from the support table 26 to a position higher than the other individual stages 27a to 27c.

The support table 26 has a drive mechanism (not shown), which raises the telescopic rods 27e to 27g to the height H. Therefore, the individual stages 27a to 27c are raised together in synchronization. The telescopic rod 27h is also raised to the height H' by a drive mechanism. At this time, the telescopic rod 27h is raised simultaneously with the other telescopic rods 27e to 27g up to the height H. After reaching the height H, only the telescopic rod 27h is raised until it reaches the height H'. In other words, up to the height H, the individual stages 27a to 27d (the first group stages and the second group stage) are raised in synchronization. After the height H, only the individual stage 27d (the second group stage) is raised to the height H' relative to the other individual stages 27a to 27c (the first group stages). That is, the individual stage 27d can be raised independently from the individual stages 27a to 27d. The drive mechanisms are electrically connected to the control unit 70a.

As shown in FIGS. 5A and 5B, the control unit 70a is located in the vicinity of the transfer apparatus main body 70. The control unit 70a has switches (not shown). An operator manipulates the switches to instruct the transfer apparatus main body 70 to raise or lower the battery unit 3. At this time, the overall lift mechanism 36 and the telescopic rods 27e to 27h are controlled by the control unit 70a. The control unit 70a controls the telescopic rods 27e to 27h and stores control programs for controlling the overall lift mechanism 36. The control unit 70a also functions as stopping section, which stops the rising motion of the individual stages 27a to 27d caused by the telescopic rods 27e to 27h.

As shown in FIG. 4B, the limit switches 28 are attached to a part of the surface of the individual stages 27a to 27d where the corresponding lock devices 5a to 5d contact the housing 13. The limit switches 28 are electrically connected to the control unit 70a. When pressed by the housings 13, the limit switches 28 detect that the lock devices 5a to 5d contact the individual stages 27a to 27d, and output contact signals. The limit switches 28 may be replaced by pressure sensors that are capable of detecting pressure of the lock devices 5a to 5d located on the individual stages 27a to 27d, respectively.

As shown in FIG. 3, the pins 11 are located on the individual stages 27a to 27d to be received by the insertion holes 13c in the lock devices 5a to 5d fixed to the case 3a of the battery unit 3.

The pins 11 vertically extend upward from the surface of the individual stages 27a to 27d. Each pin 11 is connected to a corresponding second solenoid 110 provided in corresponding one of the individual stages 27a to 27d. The second solenoids 110 are electrically connected to the control unit 70a, which is shown in FIGS. 5A and 5B.

When the battery unit 3 is removed, each second solenoid 110 is activated based on a contact signal of the corresponding limit switch 28, thereby changing the length of the corresponding pin 11. Specifically, when activated based on a contact signal, each pin 11 is protruded to have a length that is longer than the normal length. When in such an elongated state, the pin 11 contacts the pawl 17. When at the normal length, the pins 11 are in the insertion holes 13c of the lock devices 5a to 5d (see FIG. 3), and determine the position of the battery unit 3 on the individual stages 27a to 27d.

In the station 10 shown in FIG. 1, the battery unit 3 is mounted to and removed from the vehicle body 1a in the following manners. The operation will be described with reference to the flowcharts of FIGS. 7 and 8, together with control of the transfer apparatus main body 70 by the control unit 70a.

First, the battery unit 3 is placed on the individual stages 27a to 27d. Then, through manipulation of switches by an operator, the control unit 70a executes control programs. Accordingly, the overall lift mechanism 36 is raised to a predetermined position in the transfer apparatus main body 70 (step S1 in FIG. 7). The predetermined position is the upper limit of a predetermined range of movement of the overall lift mechanism 36 of the transfer apparatus main body 70. Accordingly, the support table 26 is raised as shown in FIG. 5A, the individual stages 27a to 27d and the telescopic rods 27e to 27h, which are connected to the individual stages 27a to 27d, are raised as a whole (see the solid black arrow in FIG. 5A).

Figure 7:
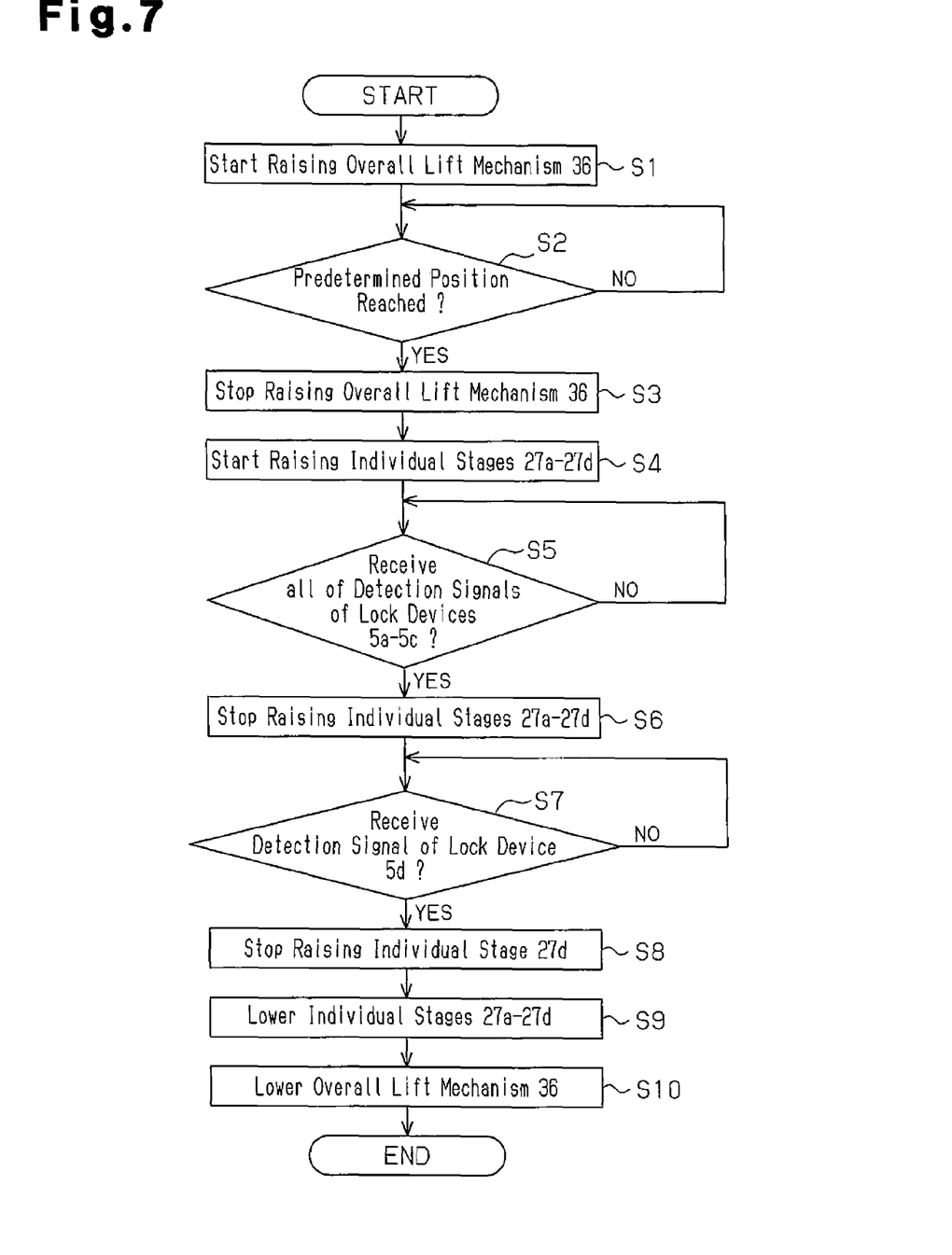
FIG. 7 is a control flowchart of the transfer apparatus during a process for mounting the battery unit to the vehicle body.

Next, as shown in FIG. 7, the control unit 70a determines whether the overall lift mechanism 36 has reached a predetermined position (step S2). When determining that the overall lift mechanism 36 has reached the predetermined position (step S2: YES), the control unit 70a stops lifting motion of the overall lift mechanism 36 (step S3). If the control unit 70a determines that the overall lift mechanism 36 has not reached the predetermined position (step S2: NO), step S1 is repeated, and the overall lift mechanism 36 is continuously raised.

After the raising of the overall lift mechanism 36 is stopped, the control unit 70a causes the drive mechanisms to simultaneously raise all the telescopic rods 27e to 27h, so that the individual stages 27a to 27c (the first group stages) and the individual stage 27d (the second group stage) are raised in synchronization (step S4). Accordingly, as shown in FIG. 5B, all the telescopic rods 27e to 27h are raised, so that all the individual stages 27a to 27d and the battery unit 3 placed thereon are raised (see the arrows outlined in black in the FIG. 5B).

When the individual stages 27a to 27d and the battery unit 3 are raised, first, the strikers 90b of the striker devices 9a to 9c are engaged with the corresponding lock devices 5a to 5c. Specifically, as shown in FIG. 3, the striker 90b, which has entered the entry opening 13b, presses the latch 15. This causes the latch 15 to swing against the force of the coil spring and be locked. The pawl 17 is also swung, so that the locking piece 17a is engaged with the engaging surface 15d of the latch 15, and the latch 15 is locked against swinging. Further, the lock pin 25 projects to lock the pawl 17 against swinging. Accordingly, the proximity sensor 20 transmits a detection signal to the control unit 70a. The control unit 70a also receives detection signals output by the proximity sensors 20 via the in-unit controller.

As described above, among the striker devices 9a to 9d, which are fixed to the vehicle body 1a, the striker devices 9a to 9c are fixed substantially at the same height in the mounting space 1b, and the striker device 9d is fixed at a position higher than the other striker devices 9a to 9c. More specifically, in the mounting space 1b, the striker devices 9a to 9c are fixed at positions where the striker devices 9a to 9c are engaged with the corresponding lock devices 5a to 5c before the individual stages 27a to 27d reach the height H, which is the upper limit within the range of vertical movement of the individual stages 27a to 27d. In contrast, the striker device 9d is fixed at a position where the striker device 9d is engaged with the corresponding lock device 5d when the individual stage 27d reaches the height H', which is the upper limit within the range of vertical movement of the individual stage 27d.

Therefore, when the individual stages 27a to 27d are raised, the strikers 90b of the striker devices 9a to 9c are first engaged with the corresponding lock devices 5a to 5c. By the coordinates of the three locations of the engagement, the imaginary plane defined by the striker devices 9a to 9c of the vehicle body 1a become parallel with the imaginary plane defined by the lock devices 5a to 5c of the battery unit 3. The order of the three locations at which the engagement is achieved varies depending on manufacturing tolerances.

During this time, as shown in FIG. 7, the control unit 70a determines whether it has received detection signals from the lock devices 5a to 5c, which correspond to first three locations of engagement (step S5). If the control unit 70a determines that it has not received detection signals from all the three locations (step S5: NO), step S4 is repeated, and all the telescopic rods 27e to 27h are continuously raised.

When the control unit 70a has received detection signals from all the lock devices 5a to 5c (step S5: YES), the control unit 70a stops raising the telescopic rods 27e to 27g, thereby stopping raising the individual stages 27a to 27c (step S6). In addition to assembly tolerance described above, the battery unit 3 has a flexure caused by the weight thereof. Therefore, the proximity sensors 20 of the three lock devices 5a to 5c, which are engaged first, output detection signals at different times.

After stopping raising the individual stages 27a to 27c, the control unit 70a continues raising the telescopic rod 27h, thereby raising only the individual stage 27d.

When only the individual stage 27d is raised, a specific part of the battery unit 3 (a part in the vicinity of the lock device 5d) is slightly flexed. During this time, the control unit 70a determines whether it has received a detection signal from the lock device 5d (step S7). If the control unit 70a has not received a detection signal from the lock device 5d (step S7: NO), step S7 is repeated, and only the individual stage 27d continues being raised.

Then, the striker 90b of the remaining one striker device 9d the lock device 5d are engaged with each other. At this time, the proximity sensor 20 of the lock device 5d outputs a detection signal. When having received a detection signal from the lock device 5d, in other words, when having received detection signals from all the four locations (step S7: YES), the control unit 70a stops raising the individual stage 27d (step S8).

The battery unit 3 is thus mounted to the vehicle body 1a. Thereafter, the control unit 70a retracts all the telescopic rods 27e to 27h, thereby lowering all the individual stages 27a to 27d (step S9). The control unit 70a then lowers the overall lift mechanism 36 (step S10). The operation of the transfer apparatus main body 70 is thus completed.

At same time, electrical connection between the batteries in the battery unit 3 and the electric vehicle 1 is established. Mounting of the battery unit 3 to the vehicle body 1a is thus completed.

The striker device 9d and the lock device 5d are selected in advance to be ones that are engaged last in the mounting process. That is, in the battery unit mounting apparatus, only the striker device 9d is located at a position higher than the other striker devices 9a to 9c in the mounting space 1b. After the striker devices 9a to 9c and the lock devices 5a to 5c are engaged, only the individual stage 27d is raised. Thus, when the striker device 9d and the lock device 5d are engaged, the battery unit 3, which includes the already engaged combinations A to C (the vicinities of the lock devices 5a to 5c), does not receive excessive load in the transfer apparatus main body 70.

When removing the battery unit 3, the electric vehicle 1 is parked at a predetermined position on the upper floor 10a of the station 10 as shown in FIG. 2. In this state, the individual stages 27a to 27d and the overall lift mechanism 36 are raised as shown in FIG. 3. At this time, until the height H is reached, the individual stages 27a to 27d are raised in synchronization. Thereafter, until the height H' is reached, only the individual stage 27d is raised. The pins 11 of the individual stages 27a to 27d are inserted into the corresponding the insertion holes 13c, and the individual stages 27a to 27d are caused to contact the battery unit 3 and the corresponding lock devices 5a to 5d. Also, the first solenoid 19 is activated, so that the lock pin 25 is retracted into the first solenoid 19. This unlocks the pawl 17 so that it is free to swing.

Further, when the individual stages 27a to 27d contact the lock devices 5a to 5d, the limit switches 28 are pressed and contact signals are output. Based on the contact signals, the control unit 70a activates the second solenoids 110. Accordingly, each pin 11 is projected to press the operative piece 17b of the corresponding pawl 17. Then, the pawl 17 is swung against the force of the coil spring, so that the pawl 17 unlocks the latch 15. This causes the latch 15 to swing to be released, so that the striker 90b is released.

Thereafter, the individual stages 27a to 27d are lowered. After the lowering of the individual stages 27a to 27d is complete, the overall lift mechanism 36 starts being lowered. Removal of the battery unit 3 from the vehicle body 1a is thus completed. At this time, electrical connection between the batteries in the battery unit 3 and the electric vehicle 1 is simultaneously cancelled.

As described above, the battery unit mounting apparatus includes the four striker devices 9a to 9d and the corresponding lock devices 5a to 5d. In the battery unit mounting apparatus, the striker devices 9a to 9d are engaged with the lock devices 5a to 5d at four locations. This allows the battery unit 3 to be stably mounted in the mounting space 1b of the vehicle body 1a even when the electric vehicle 1 is traveling.

Among the combinations of the striker devices 9a to 9d and the lock devices 5a to 5d in the battery unit mounting apparatus, the combinations of the striker devices 9a to 9c and the lock devices 5a to 5c are sorted into the first engagement group, and the other combination of the striker device 9d and the lock device 5d is sorted into the second engagement group.

The transfer apparatus main body 70 has the individual stages 27a to 27c and the individual stage 27d. When the battery unit 3 is placed on the individual stages 27a to 27d, the individual stages 27a to 27c support from below the lock devices 5a to 5c, and the individual stage 27d supports from below the lock device 5d, which belongs to the second engagement group. The transfer apparatus main body raises the battery unit 3 in the station 10 through the communication opening 10c, and mounts the battery unit 3 to the mounting space 1b provided in the bottom of the vehicle body 1a. The transfer apparatus main body 70 is also capable of removing the battery unit 3 from the mounting space 1b.

Therefore, according to the battery unit mounting apparatus and the transfer apparatus 7 (the transfer apparatus main body 70), when mounting the battery unit 3 to the mounting space 1b, the striker device 9d and the lock device 5d, which belong to the second engagement group, are allowed to be engaged after the striker devices 9a to 9c and the lock devices 5a to 5c, which belong to the first engagement group, are all engaged.

Therefore, the battery unit mounting apparatus and the transfer apparatus 7 of the first embodiment are capable of reliably mounting the battery unit 3 to the bottom of the vehicle body 1a, while ensuring a desired durability of the battery unit 3.

Particularly, the battery unit mounting apparatus has the striker devices 9a to 9d (the striker 90b) and the lock devices 5a to 5d, which serve as fixing portions and portions-to-be-fixed, respectively. Therefore, the battery unit mounting apparatus is capable of mounting and removing the battery unit 3 to and from the vehicle body 1a by raising the battery unit 3 to a predetermined mounting position in the vehicle body 1a, that is, the mounting space 1b using the transfer apparatus main body 70.

Further, the use of the striker devices 9a to 9d and the lock devices 5a to 5d simplifies the structure the battery unit mounting apparatus and the structure of the vehicle body 1a of the electric vehicle 1. Thus, the electric vehicle 1 has an increased flexibility in determining the mounting position of the battery unit 3.

The first engagement group may be formed by any three of the four pairs of the striker devices 9a to 9d and the corresponding lock devices 5a to 5d. In other words, the second engagement group may be formed by any one of the four pairs of the striker devices 9a to 9d and the corresponding lock devices 5a to 5d. The position of the striker device that is selected as the second engagement group is set to be higher than the other striker devices, and the height to which the corresponding individual stage can be raised is set to be higher than the heights to which the other individual stages can be raised. That is, the raising range of the individual stage that corresponds to the striker device of the second engagement group is set to be wider than the raising ranges of the other individual stages.

Second Embodiment

A transfer apparatus 7 according to a second embodiment includes a transfer apparatus main body 71 and a control unit 70a. The transfer apparatus main body 71 has an individual stage 27d and an individual stage 27i on a support table 26 a shown in FIG. 8. The individual stage 27i is capable of supporting from below the lock devices 5a to 5c, which belong to the first engagement group. That is, the individual stage 27i forms a first group stage.

Figure 8:
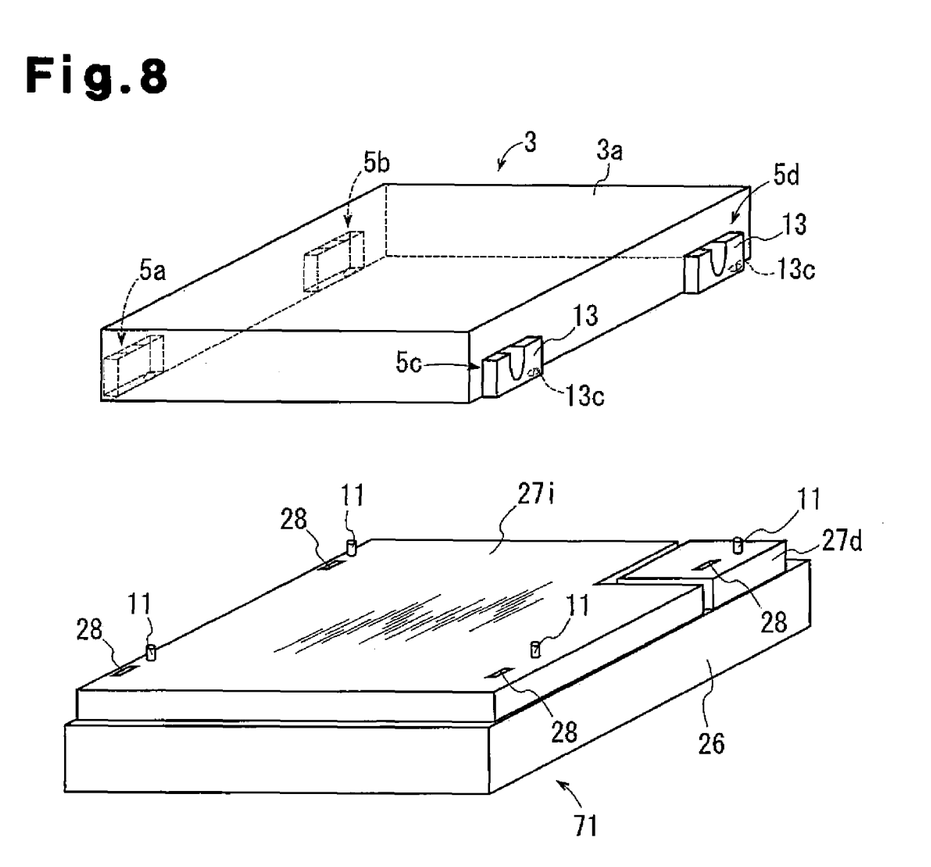
FIG. 8 is a perspective view illustrating a battery unit, lock devices, and individual stages according to a second embodiment.

Although not illustrated, the individual stage 27i is connected to the telescopic rods 27e to 27g on its back side, or the lower side. The number of telescopic rods connected to the individual stage 27i may be changed as necessary in accordance with the center of gravity of the battery unit 3 as well as the weight of the battery unit 3.

Pins 11 and limit switches 28 are provided on the surface of the individual stage 27i at positions corresponding to the lock devices 5a to 5c. The other structures of the transfer apparatus main body 71, including the individual stage 27d, are the same as those of the transfer apparatus main body 70 according to the first embodiment, and like or the same reference numerals are given to those components that are like or the same as the corresponding components of the first embodiment and detailed explanations are omitted. The structure of the battery unit mounting apparatus, which includes the lock devices 5a to 5c, and the structure of the control unit 70a are the same as those of the first embodiment.

Since, according to the transfer apparatus main body 71, the single individual stage 27i supports the three lock devices 5a to 5c from below, the number of components is reduced compared to the transfer apparatus main body 70 of the first embodiment. This facilitates the manufacture of the transfer apparatus main body 71. Other than that, the transfer apparatus 7 having the transfer apparatus main body 71 has the same advantages as that of the first embodiment.

Therefore, the transfer apparatus 7 of the second embodiment is also capable of reliably mounting the battery unit 3 to the bottom of the vehicle body 1a, while ensuring a desired durability of the battery unit 3.

Although only the first and second embodiments have been described so far, the present invention is not limited thereto, but may be modified as follows without exceeding the scope of the invention.

For example, in the first and second embodiments, four recesses may be formed in the case 3a, and the lock devices 5a to 5d may be placed in the recesses to fix the lock devices 5a to 5d to the case 3a. In this case, the lock devices 5a to 5d do not protrude from the battery unit 3, so that the size the mounting space 1b can be reduced.

In the first and second embodiments, five or more striker devices and five or more lock devices may be provided, and the vehicle body 1a and the battery unit 3 may be fixed to each other at five or more locations. In this case, two or more lock devices belong to the second engagement group. The transfer apparatus main body 70, 71 may include individual transfer apparatuses that correspond to each of the lock devices belonging to the second engagement group. Alternatively, a single individual transfer apparatus may be provided to that is capable of supporting the lock device belonging to the second engagement group.

In the first and second embodiments, the striker device 9d of the striker devices 9a to 9d of the vehicle body 1a is located at a position higher than the other striker devices 9a to 9c, and the lock devices 5a to 5d of the battery unit 3 are located substantially at the same height. However, the arrangement of the striker devices 9a to 9d and the lock devices 5a to 5d is not limited to the arrangement illustrated above. For example, the striker devices 9a to 9d of the vehicle body 1a may be located substantially at the same height, and the lock device 5d of the lock devices 5a to 5d of the battery unit 3 may be located at a position lower than the other lock devices 5a to 5c. Also, the vertical positions, or positions in the up-down direction, of the lock devices 5a to 5d and the striker devices 9a to 9d are not required to be the same. Specifically, the vertical positions may be different as long as, in a state where the battery unit 3 is caused to approach the mounting space 1b of the electric vehicle 1 to be mounted, the distance in one of the pairs of the lock devices 5a to 5d and the striker devices 9a to 9d (for example, the distance between the lock device 5a and the striker device 9a) is greater than those of the other pairs.

The first and second embodiments have been described on the assumption that the upper surface of the battery unit 3 and the bottom surface of the mounting space 1b of the electric vehicle 1 are arranged to be parallel with each other in advance. However, the present invention is not limited to that configuration. For example, as in the case of the apparatus disclosed in Japanese Laid-Open Patent Publication No. 2010-173364, the present invention may be combined with a battery unit transfer apparatus that deals with the inclination of the bottom of a vehicle body. Specifically, the present invention may be employed on the upper surface of the jig, on which a battery unit is mounted, in the battery unit transfer apparatus of the publication.

Therefore, the present examples and embodiments are to be considered as illustrative and not restrictive and the invention is not to be limited to the details given herein, but may be modified within the scope and equivalence of the appended claims.

The invention claimed is:

1. A battery unit mounting apparatus for an electric vehicle, the apparatus comprising:
    four or more fixing portions configured to be arranged at the bottom of the vehicle body of an electric vehicle; and
    four or more portions-to-be-fixed configured to be arranged on a battery unit, each portion-to-be-fixed corresponding to one of the fixing portions, wherein
    when the battery unit is raised to approach the vehicle body bottom, the battery unit mounting apparatus is used to cause each fixing portion to be engaged with the corresponding one of the portions-to-be-fixed, thereby mounting the battery unit to the vehicle body bottom,
    the fixing portions and the portions-to-be-fixed are sorted into a first engagement group formed by three of the fixing portions and corresponding three of the portions-to-be-fixed, and a second engagement group formed by the remaining one or more of the fixing portions and the remaining one or more of the portions-to-be-fixed, and
    a configuration of the fixing portion and the portion-to-be-fixed in the second engagement group which allows the fixing portion and the portion-to-be-fixed in the second engagement group to be engaged with each other after the fixing portions and the portions-to-be-fixed in the first engagement group are all engaged.

2. The battery unit mounting apparatus for an electric vehicle according to claim 1, wherein
    the three fixing portions in the first engagement group are arranged substantially at the same height, and
    the fixing portion of the second engagement group is located at a position higher than the fixing portions in the first engagement group.

3. A battery unit transfer apparatus for an electric vehicle used with a battery unit mounting apparatus for an electric vehicle, the battery unit transfer apparatus being configured to raise a battery unit toward the bottom of a vehicle body, the battery unit mounting apparatus comprising:
    four or more fixing portions configured to be arranged at the bottom of the vehicle body of an electric vehicle; and
    four or more portions-to-be-fixed configured to be arranged on a battery unit, each portion-to-be-fixed corresponding to one of the fixing portions, wherein:
    the fixing portions and the portions-to-be-fixed are sorted into a first engagement group formed by three of the fixing portions and corresponding three of the portions-to-be-fixed, and a second engagement group formed by the remaining one or more of the fixing portions and the remaining one or more of the portions-to-be-fixed, and
    a configuration of the fixing portion and the portion-to-be-fixed in the second engagement group which allows the fixing portion and the portions-to-be-fixed in the second engagement group to be engaged with each other after the fixing portions and the portions-to-be-fixed in the first engagement group are all engaged, and
    the battery unit transfer apparatus comprises:
    at least one first group stage configured to support from below the three portions-to-be-fixed of the first engagement group,
    a second group stage from below the portion-to-be-fixed in the second engagement group, and
    the second group stage is configured to be raised in synchronization with the first group stage, or to be raised relative to the first group stage.

4. The battery unit transfer apparatus for an electric vehicle according to claim 3, wherein the least one first group stage comprises three individual stages, each of which supports one of three of the portions-to-be-fixed.

5. The battery unit transfer apparatus for an electric vehicle according to claim 3, wherein the at least one first group stage comprises a single stage for supporting three of the portions-to-be-fixed.

6. A battery unit mounting apparatus for an electric vehicle, the apparatus comprising a plurality of stages configured to support a battery unit, wherein:
    the stages comprise three individual stages that are sorted as first group stages and at least one individual stage that is sorted as a second group stage,
    the individual stages that are the first group stages are raised in synchronization, and
    the second group stage is configured to be raised in synchronization with the first group stages, configured to be raised independently from the first group stages, or configured to be raised to a position higher than that of the first group stages.

* * * * *